United States Patent
Hong et al.

(10) Patent No.: US 10,299,155 B2
(45) Date of Patent: May 21, 2019

(54) INFORMATION EXCHANGE FOR CELLULAR NON-CELLULAR INTERWORKING

(71) Applicant: AVAGO TECHNOLOGIES INTERNATIONAL SALES PTE. LIMITED

(72) Inventors: Wei Hong, Beijing (CN); Na Wei, Beijing (CN); Erlin Zeng, Beijing (CN); Haiming Wang, Beijing (CN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 189 days.

(21) Appl. No.: 14/758,660

(22) PCT Filed: Jan. 18, 2013

(86) PCT No.: PCT/CN2013/070651
§ 371 (c)(1),
(2) Date: Jun. 30, 2015

(87) PCT Pub. No.: WO2014/110777
PCT Pub. Date: Jul. 24, 2014

(65) Prior Publication Data
US 2015/0341821 A1 Nov. 26, 2015

(51) Int. Cl.
*H04W 28/02* (2009.01)
*H04W 48/10* (2009.01)
(Continued)

(52) U.S. Cl.
CPC ... *H04W 28/0215* (2013.01); *H04W 28/0226* (2013.01); *H04W 28/0236* (2013.01);
(Continued)

(58) Field of Classification Search
CPC ......... H04W 28/0215; H04W 28/0226; H04W 28/0236; H04W 28/08; H04W 36/22;
(Continued)

(56) References Cited

U.S. PATENT DOCUMENTS

2003/0174678 A1* 9/2003 Chang ................. H04W 76/40
370/335
2006/0189331 A1 8/2006 Lundsjo et al.
(Continued)

FOREIGN PATENT DOCUMENTS

CN 102685927 A 9/2012
WO 2004 091246 10/2004
(Continued)

OTHER PUBLICATIONS

International Search Report dated Oct. 17, 2013, in PCT/CN2013/070651 filed Jan. 18, 2013.
(Continued)

*Primary Examiner* — Hoang-Chuong Q Vu
(74) *Attorney, Agent, or Firm* — Xsensus/Broadcom

(57) ABSTRACT

There are provided measures for information exchange for cellular non-cellular interworking such as for example LTE/UTRA-WiFi interworking. Such measures may exemplarily comprise measures for reporting, e.g. from an access point of a non-cellular local-area communication system or a terminal being served in a cellular wide-area communication system, information about at least one access point of the non-cellular local-area communication system to a radio access network level of the cellular wide-area communication system, and performing, at the radio access network level of the cellular wide-area communication system, traffic offloading management for at least one terminal being served in the cellular wide-area communication system to enable offloading of terminal-related traffic from the cellular
(Continued)

wide-area communication system to the non-cellular local-area communication system on the basis of the obtained access point information.

20 Claims, 6 Drawing Sheets

(51) Int. Cl.
| | |
|---|---|
| *H04W 28/08* | (2009.01) |
| *H04W 36/22* | (2009.01) |
| *H04W 88/06* | (2009.01) |
| *H04W 92/12* | (2009.01) |
| *H04W 84/12* | (2009.01) |

(52) U.S. Cl.
CPC ............ *H04W 28/08* (2013.01); *H04W 36/22* (2013.01); *H04W 48/10* (2013.01); *H04W 84/12* (2013.01); *H04W 88/06* (2013.01); *H04W 92/12* (2013.01)

(58) Field of Classification Search
CPC . H04W 36/0083; H04W 52/34; H04W 48/10; H04W 84/12; H04W 88/06; H04W 92/12
See application file for complete search history.

(56) References Cited

U.S. PATENT DOCUMENTS

| | | | | |
|---|---|---|---|---|
| 2013/0083661 A1* | 4/2013 | Gupta | ............... | H04W 28/0215 370/235 |
| 2014/0334446 A1* | 11/2014 | Lim | ..................... | H04W 48/20 370/331 |
| 2014/0337935 A1* | 11/2014 | Liu | ........................ | H04W 12/04 726/4 |
| 2015/0045024 A1* | 2/2015 | Lunden | ................. | H04W 48/16 455/434 |
| 2015/0045029 A1* | 2/2015 | Dalsgaard | ......... | H04W 36/0083 455/436 |
| 2015/0045032 A1* | 2/2015 | Tomici | .................. | H04W 36/04 455/436 |
| 2015/0063206 A1* | 3/2015 | Kneckt | ................. | H04W 48/16 370/328 |
| 2015/0163805 A1* | 6/2015 | Cattoni | ............. | H04W 72/0453 370/329 |
| 2015/0282011 A1* | 10/2015 | Watfa | ................ | H04W 36/0022 370/332 |
| 2015/0312823 A1* | 10/2015 | Li | ......................... | H04W 36/14 370/236 |
| 2015/0365894 A1* | 12/2015 | Bai | ....................... | H04L 1/1854 370/311 |
| 2017/0078922 A1* | 3/2017 | Raleigh | ................ | H04W 28/10 |
| 2017/0099617 A1* | 4/2017 | Tomici | ................. | H04W 28/08 |

FOREIGN PATENT DOCUMENTS

| | | |
|---|---|---|
| WO | 2012 136253 | 10/2012 |
| WO | 2012 140314 | 10/2012 |

OTHER PUBLICATIONS

Chinese Office Action dated Dec. 5, 2017 for related Chinese Application No. 201380070981.0. 8 pages.

* cited by examiner

INFORMATION EXCHANGE FOR CELLULAR NON-CELLULAR INTERWORKING

FIELD

The present invention relates to information exchange for cellular non-cellular interworking. More specifically, the present invention relates to measures (including methods, apparatuses and computer program products) for realizing information exchange for cellular non-cellular interworking such as for example LTE/UTRA-WiFi interworking.

BACKGROUND

In the development of wireless communication systems, techniques of interworking between a cellular wide-area communication system and a non-cellular local-area communication system receive attention. In this regard, a specific issue relates to traffic offloading from a cellular wide-area communication system to a non-cellular local-area communication system. Thereby, an operator of a cellular wide-area communication system operating on a licensed band is enabled to additionally utilize an unlicensed band so as to efficiently increase bandwidth and throughput and/or enhance system coverage and performance. Such unlicensed band may be any ISM (industrial, scientific and medical) radio band usable for license-free error-tolerant communication applications such as Wireless LAN (WLAN) or cordless (e.g. DECT) telephony, e.g. the 915 MHz band, the 2.450 GHz band and the 5.8 GHz band.

Generally, any (licensed) band and any communication/connectivity technology operable on such (licensed) band can be used at the source side for such traffic offloading in the meaning of the present specification. That is, any reference made to LTE, LTE-A, UTRA or the like merely relates to a non-limiting example used for illustrative purposes only. Similarly, any (license-free) band and any communication/connectivity technology operable on such (license-free) band can be used at the target side for such traffic offloading in the meaning of the present specification. That is, any reference made to WLAN, DECT, or the like merely relates to a non-limiting example used for illustrative purposes only.

Hereinafter, reference is mainly made to an LTE/LTE-A system as an illustrative and non-limiting example of a cellular wide-area communication system, while an UTRA system and a non-3GPP communication system represent another non-limiting example in this regard. Further, reference is mainly made to a WLAN (or WiFi) system as an illustrative and non-limiting example of non-cellular local-area communication system, while a cordless phone system represents another non-limiting example in this regard. It is to be noted that such references are made by way of example only, and similar considerations as outlined hereinafter equally apply to other types of cellular wide-area and non-cellular local-area communication systems accordingly. Further, it is noted that WiFi as used herein is meant to refer to at least any connectivity technology addressed by the WiFi Alliance, including wireless local area networks (WLAN) based on the IEEE 802.11, which is a set of standards carrying out WLAN communication in different frequency bands (e.g. IEEE 802.11b and 802.11g/n on the 2.45 GHz ISM band, IEEE 802.11a/n/ac on the 5.8 GHz ISM band, etc.)

Recent growth in data traffic driven by mobile applications on smart phone devices, tablets, etc. has continued to strain the capacity of today's cellular networks. Therefore, network operators are increasingly utilizing unlicensed WiFi spectrum to cope with such network congestion, and this trend is expected to accelerate further as traffic demand continues to grow.

The use of unlicensed spectrum is a cost-effective approach to add the needed capacity for today's cellular networks, given the limited availability and high cost of licensed spectrum. Currently, WLAN/WiFi is integrated as a separate access network to the core network of cellular systems, such as the 3GPP EPC. This requires extra cost of deploying the complete WLAN/WiFi access network and also impacts the 3GPP core network entities. Existing WLAN/WiFi offloading solutions are based on this deployment model of distinct 3GPP and WLAN/WiFi access networks using a common core network with selective switching of flows based on operator/user policies. That is to say, LTE/UTRA-WiFi interworking is currently supported at the core network (CN) level only.

However, another deployment solution would be preferable, which results in a tighter integration and aggregation of 3GPP access network components with WLAN/WiFi access networks without any impact to and reusing the same 3GPP core network elements. That is to say, support of LTE/UTRA-WiFi interworking at the radio access network (RAN) level would be desirable.

Thus, there is a need to enable information exchange for cellular non-cellular interworking such as for example LTE/UTRA-WiFi interworking at the radio access network (RAN) level.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising obtaining, at a radio access network level of a cellular wide-area communication system, information about at least one access point of a non-cellular local-area communication system, and performing, at the radio access network level of the cellular wide-area communication system, traffic offloading management for at least one terminal being served in the cellular wide-area communication system to enable offloading of terminal-related traffic from the cellular wide-area communication system to the non-cellular local-area communication system on the basis of the obtained access point information.

According to an exemplary aspect of the present invention, there is provided a method comprising reporting information about at least one access point of a non-cellular local-area communication system to a radio access network level of a cellular wide-area communication system, and operating in accordance with a traffic offloading management for at least one terminal being served in the cellular wide-area communication system to enable offloading of terminal-related traffic from the cellular wide-area communication system to the non-cellular local-area communication system.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: obtaining, at a radio access network level of a cellular wide-area communication system, information about at least one access point of a non-cellular local-area communication system, and performing, at the radio access network level of the cellular wide-area communication system, traffic offloading management for at least one terminal being served in the cellular wide-area communication system to enable offloading of terminal-related traffic from the cellular wide-area communication system to the non-cellular local-area communication system on the basis of the obtained access point information.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: reporting information about at least one access point of a non-cellular local-area communication system to a radio access network level of a cellular wide-area communication system, and operating in accordance with a traffic offloading management for at least one terminal being served in the cellular wide-area communication system to enable offloading of terminal-related traffic from the cellular wide-area communication system to the non-cellular local-area communication system.

According to an exemplary aspect of the present invention, there is provided an apparatus comprising means for obtaining, at a radio access network level of a cellular wide-area communication system, information about at least one access point of a non-cellular local-area communication system, and means for performing, at the radio access network level of the cellular wide-area communication system, traffic offloading management for at least one terminal being served in the cellular wide-area communication system to enable offloading of terminal-related traffic from the cellular wide-area communication system to the non-cellular local-area communication system on the basis of the obtained access point information.

According to an exemplary aspect of the present invention, there is provided an apparatus comprising means for reporting information about at least one access point of a non-cellular local-area communication system to a radio access network level of a cellular wide-area communication system, and means for operating in accordance with a traffic offloading management for at least one terminal being served in the cellular wide-area communication system to enable offloading of terminal-related traffic from the cellular wide-area communication system to the non-cellular local-area communication system.

According to an exemplary aspect of the present invention, there is provided a computer program product comprising a set of instructions (e.g. computer-executable computer program code) which, when executed on an apparatus or a computer of an apparatus (e.g. an apparatus according to any one of the aforementioned apparatus-related exemplary aspects of the present invention), is arranged/configured to cause the computer or apparatus to carry out the method according to any one of the aforementioned method-related exemplary aspect of the present invention.

Such computer program product may for example comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By virtue of the aforementioned exemplary aspects of the present invention, there is enabled an information exchange for cellular non-cellular interworking such as for example LTE/UTRA-WiFi interworking at the radio access network (RAN) level.

Thereby, a tighter integration and aggregation of cellular access network components with non-cellular access networks without any impact to and reusing the same cellular core network elements may be enabled. Further, cellular non-cellular interworking may be improved in terms of (seamless and non-seamless) terminal mobility.

Thus, enhancements are achieved by methods, apparatuses and computer program products enabling/realizing information exchange for cellular non-cellular interworking.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Figure 1:
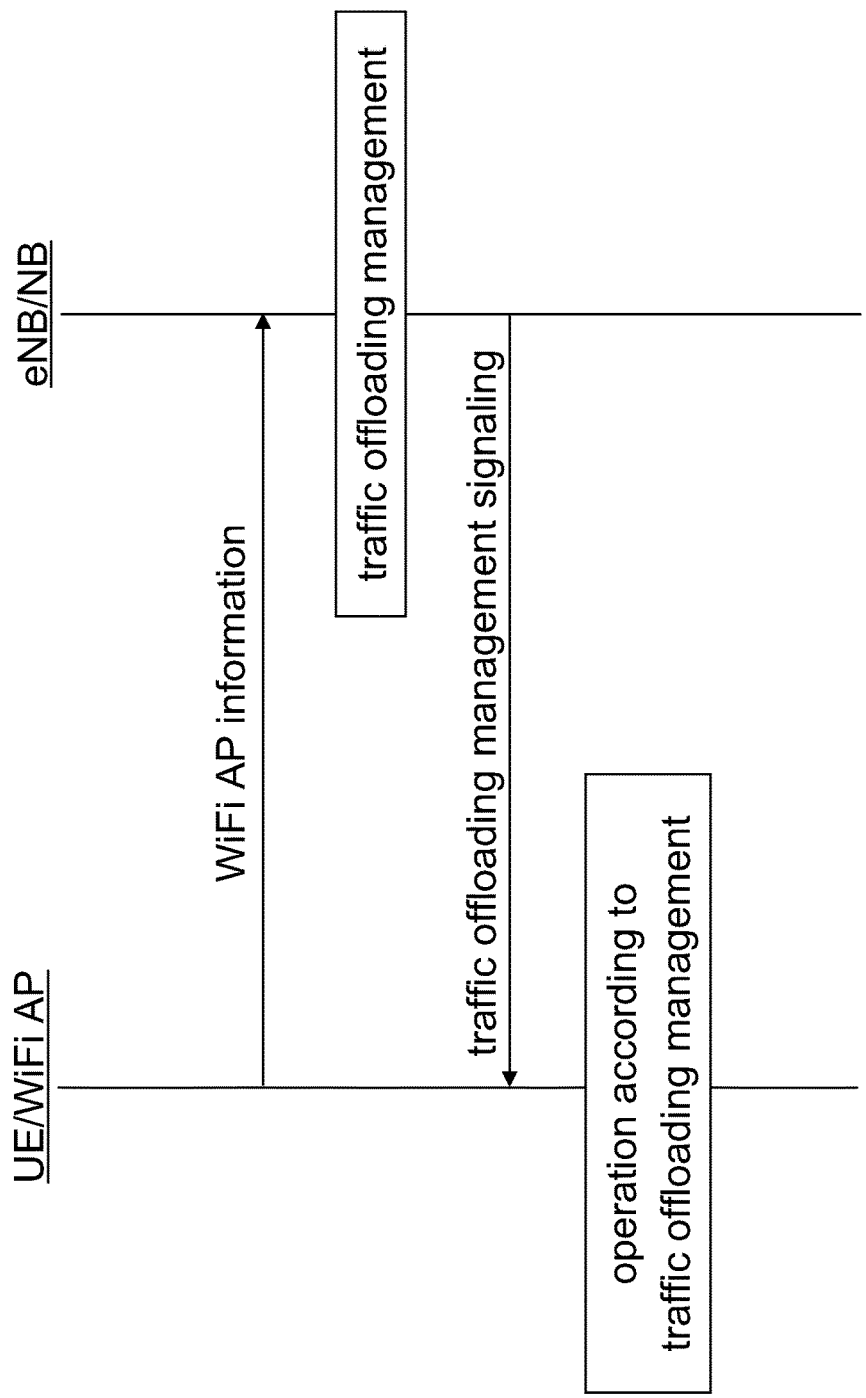
FIG. 1 shows a diagram illustrating an example of a procedure according to exemplary embodiments of the present invention.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP and IEEE specifications being used as non-limiting examples for certain exemplary network configurations and deployments. In particular, for explaining applicability of thus described exemplary embodiments in an illustrative manner, a LTE/LTE-A system is used as a non-limiting example of a cellular wide-area communication system and a WLAN (or WiFi) system is used as a non-limiting example of a non-cellular local-area communication system. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any interworking or combination scenario between a cellular wide-area communication system and a non-cellular local-area communication system.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for information exchange for cellular non-cellular interworking such as for example LTE/UTRA-WiFi interworking.

In the following, exemplary embodiments of the present invention are described with reference to methods, procedures and functions, as well as with reference to structural arrangements and configurations.

The basic deployment scenario underlying exemplary embodiments of the present invention is a cellular wide-area communication system such as LTE/LTE-A or UTRA interworking with a non-cellular local-area communication system such as WiFi or WLAN. More specifically, at least one non-cellular access point such as a WiFi/WLAN AP is deployed within the coverage/service area of a cellular base station such as eNB or NB, i.e. within the cell of the cellular wide-area communication system. Accordingly, cellular non-cellular interworking is feasible in that a terminal being served by the cellular wide-area communication system may be also served by the non-cellular local-area communication system. Namely, a terminal such as a UE may access or connect to the cellular wide-area communication system via the eNB/NB and/or may access or connect to the non-cellular local-area communication system via a WiFi/WLAN AP. Namely, a terminal such as a UE may simultaneously access or connect to both the cellular wide-area communication system and the non-cellular local-area communication system. By transferring traffic of a terminal from the cellular wide-area communication system to the non-cellular local-area communication system, traffic offloading may be accomplished.

In order to offload traffic from LTE/LTE-A or UTRA to WiFi/WLAN, the LTE/LTE-A or UTRA network shall be able to control WLANs or WLAN access points (APs), e.g. in that the operator itself deploys WLANs or WLAN APs. Such operator-deployed and operator-controlled WLAN access points could be separate from or integrated in the radio access network domain of the LTE/LTE-A or UTRA system. In this regard, a terminal operating in and thus being served in/by the LTE/LTE-A or UTRA system shall be able to find WLAN APs usable for traffic offloading, such as the operator-deployed and operator-controlled APs, before the traffic could be passed via a WLAN system.

FIG. 1 shows a diagram illustrating an example of a procedure according to exemplary embodiments of the present invention.

As shown in FIG. 1, a procedure according to exemplary embodiments of the present invention comprises reporting information about at least one access point of a non-cellular local-area communication system, e.g. a WiFi AP, to a radio access network level of a cellular wide-area communication system, e.g. LTE/LTE-A. Such reporting may be effected from at least one access point of the non-cellular local-area communication system, e.g. a WiFi AP, or a terminal UE served by the cellular wide-area communication system, e.g. LTE/LTE-A, to a base station of the cellular wide-area communication system, e.g. an eNB. Accordingly, the thus reported information about at least one access point of the non-cellular local-area communication system are obtained at the radio access network level of the cellular wide-area communication system, e.g. the eNB.

As shown in FIG. 1, the procedure according to exemplary embodiments of the present invention further comprises performing, at the radio access network level of the cellular wide-area communication system, e.g. the eNB, traffic offloading management for at least one terminal being served in the cellular wide-area communication system to enable offloading of terminal-related traffic from the cellular wide-area communication system to the non-cellular local-area communication system on the basis of the obtained access point information. Further, upon a corresponding traffic offloading management signaling e.g. from the eNB to the WiFi AP or the UE (e.g. from which the access point information have been reported), the corresponding WiFi AP or UE operates in accordance with the traffic offloading management for the at least one terminal being served in the cellular wide-area communication system, i.e. responsive to the corresponding signaling.

For example, the traffic offloading management (or the corresponding traffic offloading management signaling) may comprise notifying at least part of the obtained access point information to the at least one terminal UE, in which case the UE may decide on its own to join, leave or stay with a specific access point of the non-cellular local-area communication system (i.e. on access mobility or selection) on the basis of the notified information. Alternatively, the traffic offloading management (or the corresponding traffic offloading management signaling) may comprise commanding the at least one terminal UE to join, leave or stay with a specific access point of the non-cellular local-area communication system, in which case the eNB decides on access mobility or selection for the UE on the basis of the obtained information. Similar notions apply to a traffic offloading management with respect to a WiFi AP instead of a UE as described above.

As used herein, traffic offloading management may equally relate to the initiation of traffic offloading, termination of traffic offloading and change of traffic offloading. Namely, a UE and/or a specific WiFi AP may be signaled to start traffic offloading e.g. from LTE to WLAN (i.e. the specific AP thereof), to end traffic offloading e.g. from LTE to WLAN (i.e. the specific AP thereof), or to change from the specific AP to another AP of the WLAN for traffic offloading e.g. from LTE to WLAN.

Figure 2:
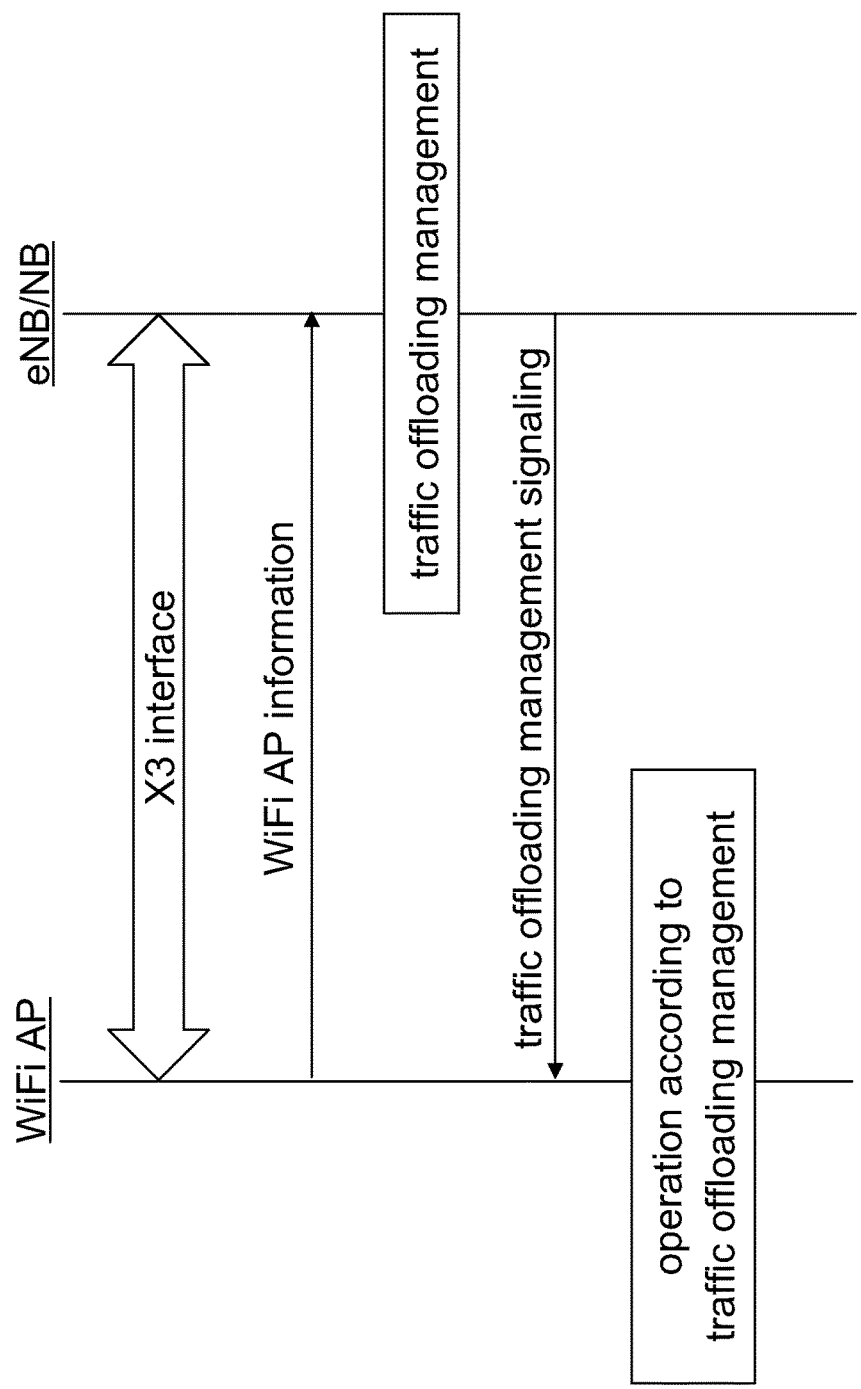
FIG. 2 shows a diagram illustrating an example of a procedure in a first exemplary deployment scenario according to exemplary embodiments of the present invention.
Figure 3:
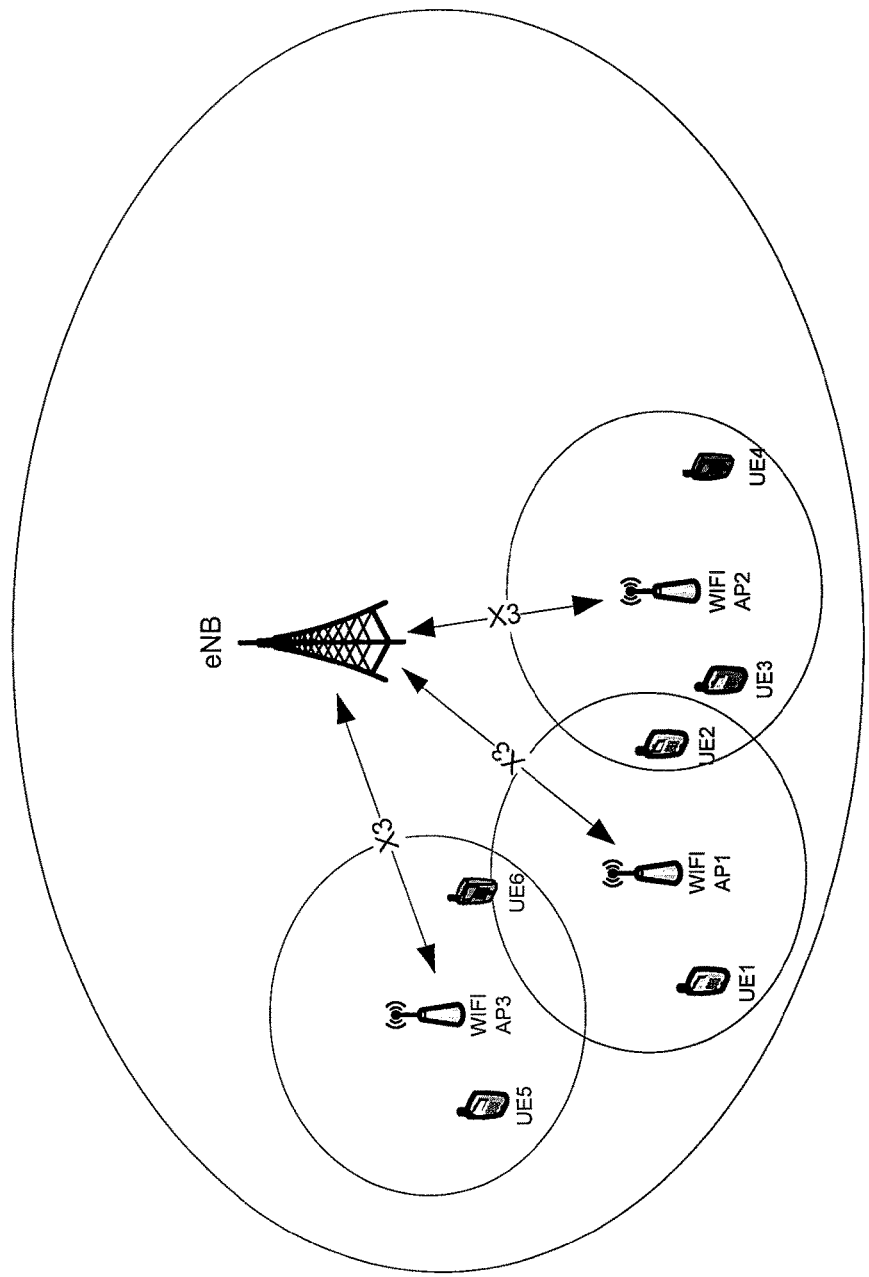
FIG. 3 shows the first exemplary deployment scenario according to exemplary embodiments of the present invention.

FIG. 2 shows a diagram illustrating an example of a procedure in a first exemplary deployment scenario according to exemplary embodiments of the present invention, while FIG. 3 shows the first exemplary deployment scenario according to exemplary embodiments of the present invention.

In the deployment scenario of FIG. 3, the larger circle represents a cell of the cellular communication system, i.e. the service or coverage area of its base station eNB, or a radio access network part/level of the cellular communication system, while the smaller circles respectively represent the service or coverage area of the access points AP of the non-cellular communication system. Any one of the WiFi APs may be collocated with or distinct from (i.e. non-collocated with) the eNB.

In this exemplary deployment scenario, an access point cooperating with the cellular base station may for example be implemented in, as or by any cellular terminal or user equipment (such as a LTE/LTE-A or UTRA UE) having both a cellular communication (e.g. LTE/LTE-A or UTRA) module and a non-cellular communication (e.g. WLAN, DECT, etc.) module, which is able to function as an access/connectivity entity for non-cellular communication (e.g. a WLAN access point, a DECT base station, etc.). For example, MiFi devices may be mentioned in this regard, i.e. wireless routers acting as (mobile) WiFi hotspots. In this regard, the term "module" may relate to any one or more of a correspondingly operable transceiver portion, processing portion, memory portion, or the like. Similarly, such access point cooperating with the cellular base station may for example be implemented in, as or by any cellular access/connectivity entity (such as a LTE/LTE-A or UTRA base station) of a small or lower layer cell (e.g. a micro, pico or femto cell), e.g. a home eNB (HeNB), which is integrated with and/or operable as an access/connectivity entity for non-cellular communication (e.g. a WLAN access point, a DECT base station, etc.).

As shown in FIGS. 2 and 3, the access point information about a particular access point is reported/obtained from said particular access point of the non-cellular local-area communication system. To this end, an interface between the eNB and a WiFi AP is utilized, which is herein referred to as X3 interface. Accordingly, an interface (exemplarily denoted as X3 interface) between cellular base stations and non-cellular access points is established in the first exemplary deployment scenario according to exemplary embodiments of the present invention, which interface is capable of assisting efficient cellular non-cellular interworking by way of required/expedient information exchange.

The X3 interface according to exemplary embodiments of the present invention may be configured for at least one or more of the following operations or functions.

In an interface setup operation or function, the X3 interface may be set up. In this regard, necessary data for the eNBs/APs for setup of the X3 interface may be exchanged, and an X3 reset may be implicitly performed. AP information being reported in this regard may be operating information, such as one or more of the respective AP's system version, working channel, communication rate, communication bandwidth, beacon information, address, network identifier (e.g. PLMN identity), and the like.

For example, an X3 setup request may be transmitted from an AP to a neighboring eNB (i.e. an eNB of a cell with at least overlapping coverage or service area) to set up the X3 interface between them. Such X3 setup request may exhibit the following or a similar format, in which M represents mandatory presence and O represents optional presence.

In an interface reset operation or function, the X3 interface may be reset. In this regard, necessary data for the eNBs/APs for reset of the X3 interface may be exchanged, and an X3 reset may be explicitly performed. AP information being reported in this regard and a potential message format are equal to or similar to those described above for the interface setup operation or function.

In a configuration update operation or function, the eNB/AP configuration may be updated. Stated in other words, the updated eNB/AP configuration could be exchanged via the X3 interface. In this regard, (application level) data needed for eNB and/or AP to interoperate correctly over the X3 interface may be updated. AP information being reported in this regard may be operating information, such as one or more of the respective AP's system version, working channel, communication rate, communication bandwidth, beacon information, address, network identifier (e.g. PLMN identity), and the like.

For example, a configuration update request may be transmitted from an AP to a neighboring eNB (i.e. an eNB of a cell with at least overlapping coverage or service area) to update its information via the X3 interface between them. Such configuration update request may exhibit the same or a similar format as described above for the interface setup operation or function.

The configuration update operation or function could be executed in a periodical or event-triggered manner. A periodic update configuration and a reporting interval for such periodic configuration update and/or an event-triggered (aperiodic) update configuration and one or more reporting events for such event-triggered (aperiodic) configuration update could be configured in any one of an X3 setup, an X3 reset and a preceding configuration update operation or function. The event or events to trigger such configuration update signalling could be changed in one or more of the corresponding AP's parameters, e.g. in terms of a change or status of operating information and/or load information of the particular access point. For example, a reporting event may be triggered when the AP changes its working channel, when the AP changes its working bandwidth, when the AP changes its working system version, when the utilization (or load) of the AP becomes higher/lower than a preconfigured threshold, or the like.

In a load management operation or function, a load-dependent processing may be accomplished. In this regard, the eNB and/or the AP may indicate resource status, over-

| IE/Group Name | Presence | Range | IE type and reference | Semantics description | Criticality | Assigned Criticality |
|---|---|---|---|---|---|---|
| Message Type | M | | | | YES | reject |
| AP MAC Address | M | | BITSTRING (SIZE(48)) | | YES | reject |
| Working channel | O | | INTEGER (0 . . . 127, . . .) | | YES | reject |
| Version | M | | ENUMERATED (a, n, ac . . .) | | YES | reject |
| PLMN Identity | M | | OCTET STRING (3) | | YES | reject |
| Beacon Information | M | | BITSTRING (SIZE(48)) | | YES | reject | load and traffic load to each other. AP information being reported in this regard may be load information, such as one or more of the respective AP's load status (or utilization), collision rate, interference status, quality-of-service (QoS) mapping, and the like. Similarly, the AP information being reported in this regard may comprise an overall general indicator on load status, or the like. For example, the overall load status (or utilization) could be expressed as/in multiple levels (e.g. high, medium, low), and/or the interference status could indicate other interfering access points or stations (i.e. terminals, etc. accessing the respective AP).

For example, AP load information message may be transmitted from an AP to a neighboring eNB (i.e. an eNB of a cell with at least overlapping coverage or service area) to transfer load information between them. Such AP load information message may exhibit the following or a similar format, in which M represents mandatory presence and O represents optional presence.

| IE/Group Name | Presence | Range | IE type and reference | Semantics description | Criticality | Assigned Criticality |
|---|---|---|---|---|---|---|
| Message Type | M | | | | YES | ignore |
| Load Status | M | | ENUMERATED (high, medium, low, . . .) | | YES | ignore |
| Collision Rate | M | | ENUMERATED (high, medium, low, . . .) | | YES | ignore |
| Interference Status | O | | | | YES | ignore |

In a mobility management operation or function, a mobility management of at least one terminal may be performed by the eNB via and/or with the help of the X3 interface. In this regard, the eNB may improve mobility performance to move certain UEs or certain UEs' certain traffic to a particular WiFi AP or vice versa, i.e. to activate/deactivate WiFi traffic offloading. AP information being reported in this regard may include one or more of the respective the respective UE's station address (i.e. the UE's address at/for the respective AP or in the respective WiFi network), a beacon trigger/change request, assistance load information, a mobility request, and the like.

As mentioned above, the eNB could tell the respective UE the load status (or utilization) and/or other AP information so that the UE could decide to join, leave or stay with the respective AP, or the eNB could directly command the respective UE to join, leave or stay with the respective AP. Such notification or command in terms of mobility management from the eNB may for example be transmitted after receiving a mobility request from any one of corresponding APs.

In an energy saving operation or function, energy consumption on the X3 interface may be reduced. In this regard, a power configuration of a respective AP and/or at least one station thereof (i.e. a terminal, etc. accessing the respective AP) may be controlled. AP information being reported in this regard may include one or more of a target AP's address, a wake up/sleep command, a scanning channel index, a recommended beacon content, a recommended WiFi operating bandwidth, a recommended MIMO operation capability, a recommended high modulation support, and the like.

In case a respective WiFi AP can control WiFi station on configurations, the respective LTE eNB may signal any one of relevant desired bandwidth, MIMO operation, high modulation support configurations for any UE's WiFi module to the respective AP, thereby enabling power saving for any UE's WiFi modules. Also, the respective LTE eNB may request one or more APs to wake up/power off or enter a dormant mode, for example.

For example, an energy saving request may be transmitted from an eNB to an AP connected via an X3 interface to request the connected AP to switch on/off/dormant, potentially also including a related configuration. Such energy saving request may exhibit the following or a similar format, in which M represents mandatory presence and O represents optional presence.

| IE/Group Name | Presence | Range | IE type and reference | Semantics description | Criticality | Assigned Criticality |
|---|---|---|---|---|---|---|
| Message Type | M | | 9.2.13 | | YES | reject |
| APs To Power On | | | | | YES | reject |
| >AP MAC Address | M | | BITSTRING (SIZE(48)) | | YES | reject |
| >Beacon Information | O | | BITSTRING (SIZE(48)) | | YES | reject |
| >Scanning channel | O | | INTEGER (0 . . . 127, . . .) | | YES | reject |
| APs To Power Off | | | | | YES | reject |
| >AP MAC Address | M | | BITSTRING (SIZE(48)) | | YES | reject |

In an operation management operation or function, an operation of a respective AP, i.e. an AP connected to a respective eNB via an X3 interface, may be controlled. In this regard, the eNB may control the AP's operation such as recommending working channel, working rate, beacon interval, or the like.

In view of the above deployment scenario and the corresponding exemplary procedure according to exemplary embodiments of the present invention, information exchange for cellular non-cellular interworking may be enabled/realized. Thereby, a tighter integration and aggregation of cellular access network components with non-cellular access networks without any impact to and reusing the same cellular core network elements may be enabled/realized. Also, cellular non-cellular interworking may be improved in terms of (seamless and non-seamless) terminal mobility.

Stated in other words, support of cellular non-cellular interworking at the radio access network (RAN) level could be achieved. This may establish a RAN level enhancement to access network mobility/selection and also to (mobility) load balancing between the interworking cellular and non-cellular systems. Accordingly, efficient access network mobility and/or selection for cellular non-cellular interworking such as for example LTE/UTRA-WiFi interworking may be provided.

Figure 4:
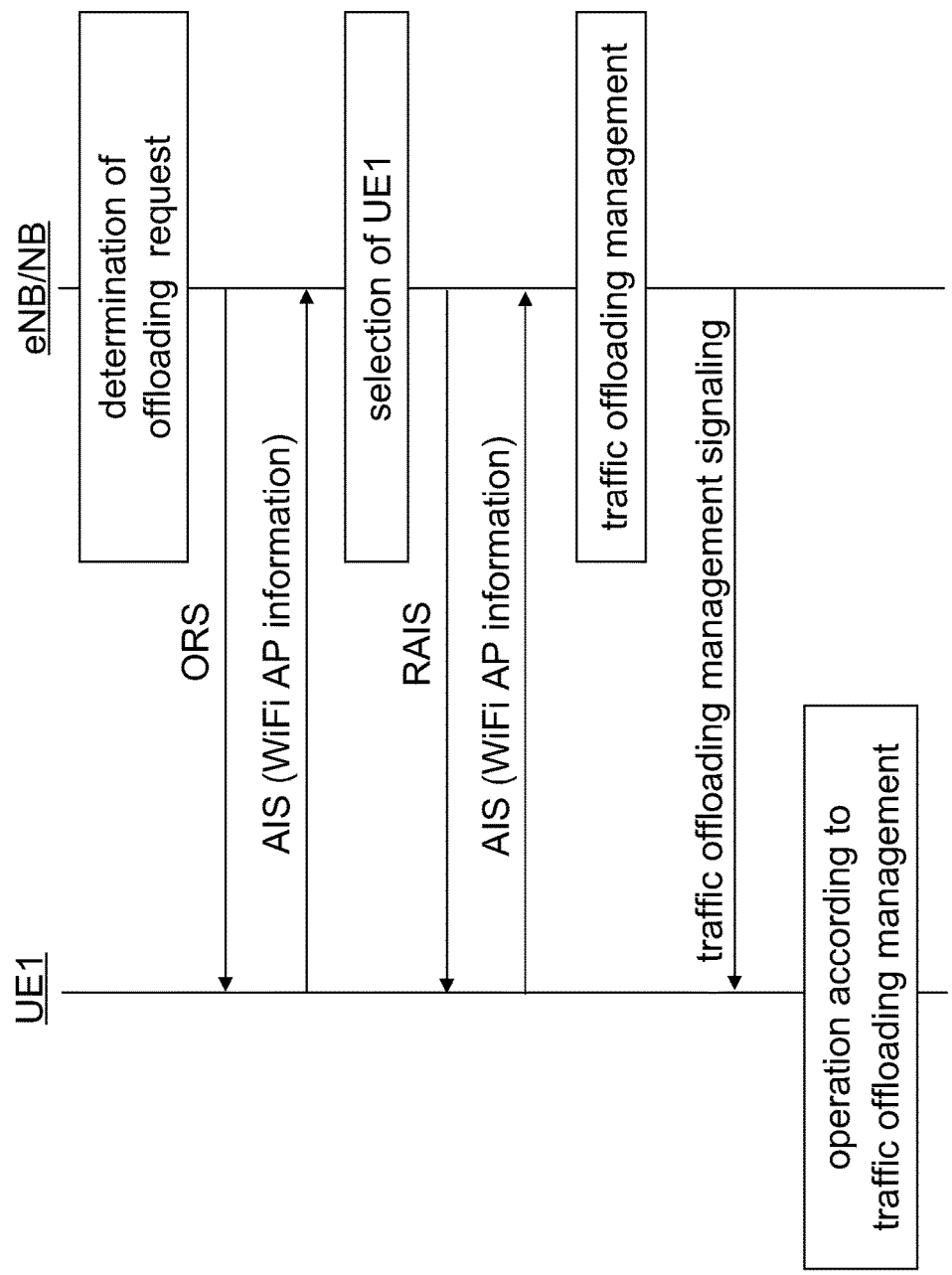
FIG. 4 shows a diagram illustrating an example of a procedure in a second exemplary deployment scenario according to exemplary embodiments of the present invention.
Figure 5:
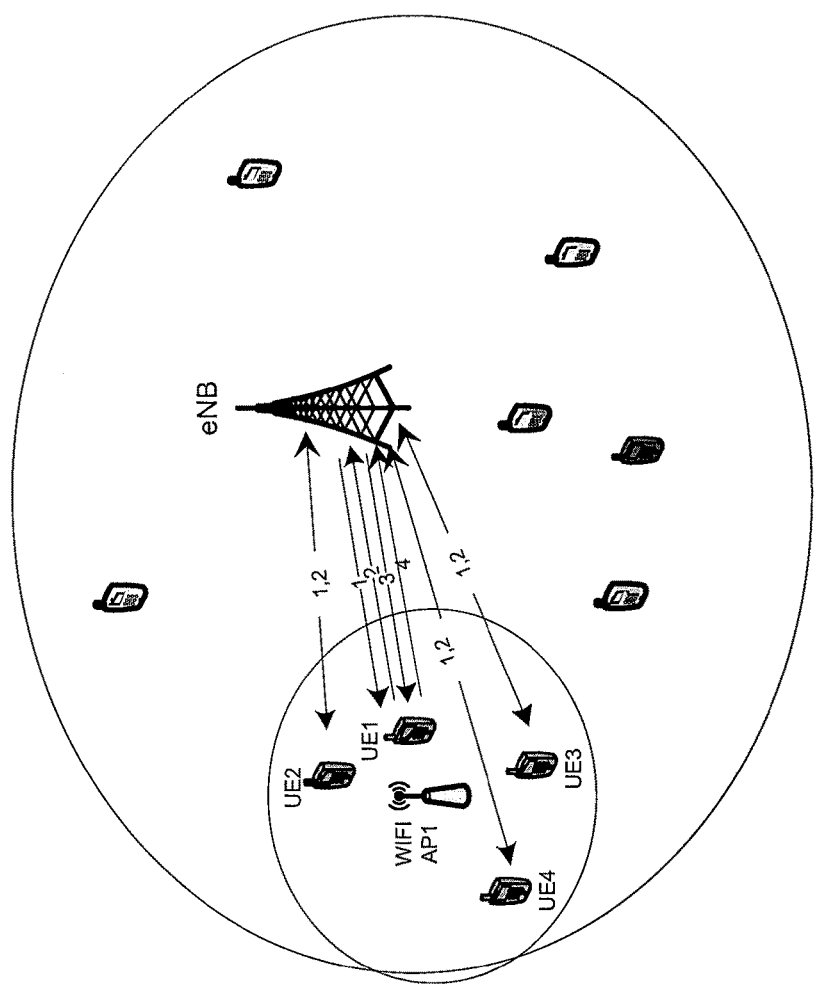
FIG. 5 shows the second exemplary deployment scenario according to exemplary embodiments of the present invention.

FIG. 4 shows a diagram illustrating an example of a procedure in a second exemplary deployment scenario according to exemplary embodiments of the present invention, while FIG. 5 shows the second exemplary deployment scenario according to exemplary embodiments of the present invention.

In the deployment scenario of FIG. 5, the larger circle represents a cell of the cellular communication system, i.e. the service or coverage area of its base station eNB, or a radio access network part/level of the cellular communication system, while the smaller circle represents the service or coverage area of the access point AP of the non-cellular communication system. The WiFi AP may be collocated with or distinct from (i.e. non-collocated with) the eNB.

In this exemplary deployment scenario, a terminal cooperating with the cellular base station may for example be implemented in, as or by any cellular terminal or user equipment (such as a LTE/LTE-A or UTRA UE) having both a cellular communication (e.g. LTE/LTE-A or UTRA) module and a non-cellular communication (e.g. WLAN, DECT, etc.) module, which is able to function as a (mobile) station for non-cellular communication (e.g. a WLAN station, a DECT station, etc.). Similarly, such terminal cooperating with the cellular base station may for example be implemented in, as or by any cellular terminal or user equipment (such as a LTE/LTE-A or UTRA UE) having both a cellular communication (e.g. LTE/LTE-A or UTRA) module and a non-cellular communication (e.g. WLAN, DECT, etc.) module, which is able to function as an access/connectivity entity for non-cellular communication (e.g. a WLAN access point, a DECT base station, etc.). For example, MiFi devices may be mentioned in this regard, i.e. wireless routers acting as (mobile) WiFi hotspots. In this regard, the term "module" may relate to any one or more of a correspondingly operable transceiver portion, processing portion, memory portion, or the like.

As shown in FIGS. 4 and 5, the access point information about a particular access point is reported/obtained from at least one terminal being (served by the cellular wide-area communication system and) associated with said particular access point. To this end, a specific signaling procedure between the eNB and one or more UEs is utilized. Accordingly, a signaling between cellular base stations and terminals is established in the second exemplary deployment scenario according to exemplary embodiments of the present invention, which signaling is capable of assisting efficient cellular non-cellular interworking by way of required/expedient information exchange.

In brief, if the eNB wants to offload a respective UE's traffic to WLAN, the eNB may request the UE to search for WLAN APs being accessible (which request may comprise certain assistance information) so as to cause the UE to get associated with a certain WLAN AP and report information on this WLAN AP to eNB. Afterwards, the eNB may choose a certain UE among UEs being requested and caused accordingly according to certain rules to report updated WLAN AP's information according to certain criteria. Thereby, it may be avoided that all corresponding UEs report updated WLAN AP's information, thus reducing power consumption.

The signaling procedure according to exemplary embodiments of the present invention may be configured as follows.

As shown in FIG. 4, the signaling procedure for WLAN AP information reporting may be as follows.

When the eNB wants to offload UE1's certain traffic to the WLAN (e.g. when a corresponding offloading request is determined), it may send a traffic offloading request such as an Offload Request Signaling (ORS) to UE1, which corresponds to signaling#1 in FIG. 5. Such ORS signaling may comprise assistance information for AP discovery in the non-cellular WLAN system. Examples of such assistance information may involve one or more of surrounding WLAN AP addresses, an association (relation) with and discovery reference data for at least one access point of the non-cellular local-area communication system, or the like. Such discovery reference data may for example comprise, for each one of the at least one access point, an operating channel and a beacon timing reference with respect to a cell timing reference (wherein the beacon timing reference relates to a timing synchronization function of the non-cellular local-area communication system and the cell timing reference relates to a sub-frame number of the cellular wide-area communication system), and/or, for each one of the at least one access point, at least one of a timing advance reference and a pathloss reference with respect to a respective access point, and/or, for each one of the at least one access point, a medium access control address of a respective access point, or the like.

After receiving the ORS signaling, UE1 may try to find surrounding WLAN APs and associate with one of them, e.g. the best one in terms of signal strength, or the like. After connecting to or accessing one AP, e.g. AP1, UE1 may send an AP Information Signaling (AIS) back to the eNB, which corresponds to signaling#2 in FIG. 5. Such AIS signaling may for example be performed immediately after association with AP1. AP information being reported in this regard may be operating information, such as one or more of the respective AP's system version, working channel, communication rate, communication bandwidth, beacon information, address (e.g. MAC address), network identifier (e.g. PLMN identity), and the like. Additionally or alternatively, AP information being reported in this regard may be load information, such as one or more of the respective AP's load status (or utilization), collision rate, interference status, quality-of-service (QoS) mapping, and the like, and/or an overall general indicator on load status, or the like. For example, the overall load status (or utilization) could be expressed as/in multiple levels (e.g. high, medium, low), and/or the interference status could indicate other interfering access points or stations (i.e. terminals, etc. accessing the respective AP).

As described above, after accessing the AP1, UE1 may report AP1's information back to the eNB using a dedicated signaling, which may include e.g. AP1's address, AP1's working channel, AP1's utilization (or load), AP1's version, etc. Such dedicated signaling, i.e. AIS, could for example be a new RRC or MAC CE and/or may be included in any suitable RRC message. In this regard, any one of the UEs may be configured in any one of various ways so as to enable such UE reporting. As an example of such way of configuration, at least one UE in the eNB's cell may be preconfigured to report the AP information about the particular AP being accessed upon first association. That is, it may be defined by default that a UE, when accessing to the AP is successful, shall report the related AP's information. As another example of such way of configuration, the traffic offloading request may comprise an enabler to configure at least one UE to report the AP information about the particular AP being accessed upon first association. That is, a UE-specific enable/disable signaling can be used (e.g. in RRC or MAC CE level), or such enabler/disabler can just reuse some spare bits in an existing signaling. As still another example of such way of configuration, a configuration signaling may be broadcast to configure at least one UE to report the AP information about the particular AP being accessed upon first association. That is, a broadcast signaling from the eNB may be used to indicate whether or not a UE, when accessing to the AP is successful, shall report the AP's information.

That is to say, the access point information about said particular access point is obtained upon first association of the at least one terminal to said particular access point in response to the traffic offloading request.

After obtaining the AP information from UE1, the eNB may also offload traffic from UE2, UE3 and UE4 to the WLAN by sending an ORS signaling, and UE2, UE3 and UE4 may also send AIS signaling back to eNB after they have connect to an AP. This is similar to the above-described procedure relating to UE1, and is merely indicated by signaling#1, 2 in FIG. 5. In the example of FIG. 5, it is exemplarily assumed that UE2, UE3 and UE4 also access and associate to AP1, while they may also access and associate to one or more different APs as well.

After getting at least one UE's report about AP's information upon first association, the eNB may further configure a certain UE for further reporting during connection with this AP.

In the present example, since UE1 to UE4 are all connected to AP1, there is no need for all of them to send updated AP information about AP1 to the eNB. So, the eNB may select/choose just one UE among UE1 to UE4 to report updated AP information about AP1 to the eNB. Such UE selection for continuing access point information reporting may be made according to certain rules. For example, the UE selecting may be based on at least one of power headroom, battery status, and position of the least one terminal. As exemplarily assumed herein, by selecting UE1 which is closer to the eNB to report AP1's updated information, less power consumption will be caused on the interface.

After selecting UE1, the eNB may send an access point information reporting request such as a Report AP Information Signaling (RAIS) to UE1, which corresponds to signaling#3 in FIG. 5. Such RAIS signaling may request a periodic reporting with a configured reporting interval or an event-triggered (aperiodic) reporting upon at least one configured event in terms of a change or status of operating information and/or load information of the particular access point.

Accordingly, only the selected terminal, i.e. UE1 in the present example, will perform continuing access point information reporting, while other terminals or UEs, which do not receive a RAIS signaling, will not report updated AP information to the eNB. Such reporting corresponds to signaling#4 in FIG. 5.

That is to say, the access point information about said particular access point is (continuously) obtained during continuing association of the selected terminal to said particular access point in response to the access point information reporting request.

The continuing access point information reporting could be executed in a periodical or event-triggered manner. A periodic reporting and a reporting interval (and, possibly, a reporting format and/or content) for such periodic reporting and/or an event-triggered (aperiodic) reporting and one or more reporting events (and, possibly, a reporting format and/or content) for such event-triggered (aperiodic) reporting could be configured by the RAIS signalling, as mentioned above. The event or events to trigger such aperiodic reporting could be changed in one or more of the corresponding AP's parameters, e.g. in terms of a change or status of operating information and/or load information of the particular access point. For example, a reporting event may be triggered when the AP changes its working channel, when the AP changes its working bandwidth, when the AP changes its working system version, when the utilization (or load) of the AP becomes higher/lower than a preconfigured threshold, or the like.

The eNB may use a dedicated signaling to request an UE to report updated AP information and also the related criteria mentioned above. Such dedicated signaling, i.e. RAIS, could for example be a new RRC or MAC CE and/or may be included in any suitable RRC message such as RRCConnectionReconfiguration.

When the selected terminal, e.g. UE1, is no longer be able to accomplish continuing AP information reporting about AP1 (for which it has been selected), e.g. due to UE1 terminating access or association to AP1 (e.g. because of leaving its service area and moving to another AP, or because of the end of traffic offloading to AP1 and moving back to the eNB), the eNB my select another UE among the UEs still associated with AP1 to continue the reporting of updated AP information about AP1.

In view of the above deployment scenario and the corresponding exemplary procedure according to exemplary embodiments of the present invention, information exchange for cellular non-cellular interworking may be enabled/realized. In particular, collection of information about non-cellular access points (including static setting information and/or dynamic information relating to an upgrade on version, load status, etc.) may be accomplished in an efficient manner. Thereby, a tighter integration and aggregation of cellular access network components with non-cellular access networks without any impact to and reusing the same cellular core network elements may be enabled/realized. Also, cellular non-cellular interworking may be improved in terms of (seamless and non-seamless) terminal mobility.

Stated in other words, support of cellular non-cellular interworking at the radio access network (RAN) level could be achieved. This may establish a RAN level enhancement to access network mobility/selection with enhanced operator control, i.e. control from the cellular system side. Accordingly, efficient access network mobility and/or selection for cellular non-cellular interworking such as for example LTE/UTRA-WiFi interworking may be provided. Further, a reliable tracking of non-cellular system information (and its updates) may be provided while saving overall power consumption at the terminal side and overhead/resources on the air interface. Still further, the status of any offloading access point in the non-cellular system may be published to the cellular system in a reliable manner.

Generally, the above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description with regard to FIGS. 1 to 5.

Figure 6:
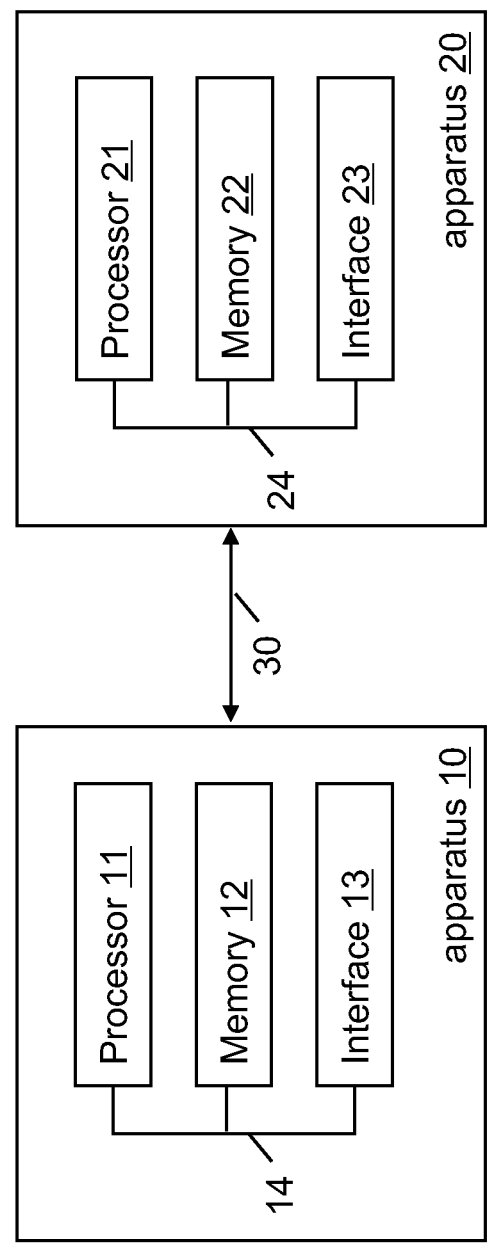
FIG. 6 shows a schematic block diagram illustrating exemplary apparatuses according to exemplary embodiments of the present invention.

In FIG. 6 below, which is noted to represent a simplified block diagram, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a schematic block diagram illustrating exemplary apparatuses according to exemplary embodiments of the present invention.

In view of the above, the thus illustrated apparatuses 10 and 20 are suitable for use in practicing the exemplary embodiments of the present invention, as described herein.

The thus illustrated apparatus 10 corresponds to an entity which may represent a (part of a) base station of a cellular (wide-area) communication system such as an eNB of a LTE/LTE-A system, a NB of a UTRA system, or the like, or a corresponding modem (which may be installed as part thereof, but may be also a separate module, which can be attached to various devices, as described above). It may be configured to perform a procedure and/or functionality as described in conjunction with any one of FIGS. 1 to 5. On the one hand, the thus illustrated apparatus 20 may correspond to an entity which may represent an (part of an) access point of a non-cellular (local-area) communication system such as an AP of WiFi, WLAN, etc., or a corresponding modem (which may be installed as part thereof, but may be also a separate module, which can be attached to various devices, as described above). In such case, it may be configured to perform a procedure and/or functionality as described in conjunction with any one of FIGS. 1 to 3. On the other hand, the thus illustrated apparatus 20 may correspond to an entity which may represent a (part of a) terminal which is operable in both a cellular (wide-area) communication system such as a LTE/LTE-A, UTRA, etc. system and a non-cellular (local-area) communication system (i.e. any wireless communication system providing access or connectivity by way of an access point) such as WiFi, WLAN, DECT, etc., or a corresponding modem (which may be installed as part thereof, but may be also a separate module, which can be attached to various devices, as described above). In such case, it may be configured to perform a procedure and/or functionality as described in conjunction with any one of FIGS. 1, 4 and 5. This apparatus may be implemented in or as a user equipment or a terminal equipment or a mobile phone which is operable in both the cellular wide-area communication system and the non-cellular local-area communication system. Stated in other words, such terminal may be or comprised in such user equipment or terminal equipment or mobile phone or the like.

Generally, any apparatus according to exemplary embodiments of the present invention may comprise a processing system. Such processing system may comprise at least one processor, at least one memory including computer program code, and at least one interface configured for communication with at least another apparatus.

As indicated in FIG. 6, according to exemplary embodiments of the present invention, each of the apparatuses may comprise at least one processor 11/21 at least one memory 12/22 and at least one interface 13/23, which are connected by at least one bus 14/24 or the like, and the apparatuses may be connected via at least one corresponding link, interface or connection 30, respectively.

The processor 11/21 and/or the interface 13/23 may be facilitated for communication over a (hardwire or wireless) link, respectively. The interface 13/23 may comprise a suitable receiver or a suitable transmitter-receiver combination or transceiver, which is coupled to one or more antennas or communication means for (hardwire or wireless) communications with the linked or connected device(s), respectively. The interface 13/23 is generally configured to communicate with another apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention. For example, the memory 12/22 may store corresponding AP information to be and/or being exchanged, configurations such as e.g. for periodic or aperiodic reporting approaches, or the like.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

In its basic form, according to some example embodiments of the present invention, the apparatus 10 or its processor 11 (or a processing system thereof) is configured to perform obtaining (at a radio access network level of a cellular wide-area communication system) information about at least one access point of a non-cellular local-area communication system, and performing (at the radio access network level of the cellular wide-area communication system) traffic offloading management for at least one terminal being served in the cellular wide-area communication system to enable offloading of terminal-related traffic from the cellular wide-area communication system to the non-cellular local-area communication system on the basis of the obtained access point information.

For cooperating with a non-cellular access point representing the apparatus 20, the apparatus 10 or its processor 11 (or a processing system thereof) may be configured to operate a corresponding interface as described as X3 interface above such that the access point information about a particular access point may be obtained via such interface.

For cooperating with a terminal representing the apparatus 20, the apparatus 10 or its processor 11 (or a processing system thereof) may be configured to perform a corresponding dedicated signaling as described above such that the access point information about a particular access point may be obtained by such dedicated signaling.

In its basic form, according to some example embodiments of the present invention, the apparatus 20 or its processor 21 (or a processing system thereof) is configured to perform reporting information about at least one access point of a non-cellular local-area communication system to a radio access network level of a cellular wide-area communication system, and operating in accordance with a traffic offloading management for at least one terminal being served in the cellular wide-area communication system to enable offloading of terminal-related traffic from the cellular wide-area communication system to the non-cellular local-area communication system.

When representing a non-cellular access point, the apparatus 20 or its processor 21 (or a processing system thereof) may be configured to operate a corresponding interface as described as X3 interface above such that the access point information about a particular access point may be reported via such interface.

When representing a terminal, the apparatus 20 or its processor 21 (or a processing system thereof) may be configured to perform a corresponding dedicated signaling as described above such that the access point information about a particular access point may be reported by such dedicated signaling.

For further details of specifics regarding functionalities according to exemplary embodiments of the present invention, reference is made to the foregoing description in conjunction with FIGS. 1 to 5.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for information exchange for cellular non-cellular interworking such as for example LTE/UTRA-WiFi interworking. Such measures may exemplarily comprise measures for reporting, e.g. from an access point of a non-cellular local-area communication system or a terminal being served in a cellular wide-area communication system, information about at least one access point of the non-cellular local-area communication system to a radio access network level of the cellular wide-area communication system, and performing, at the radio access network level of the cellular wide-area communication system, traffic offloading management for at least one terminal being served in the cellular wide-area communication system to enable offloading of terminal-related traffic from the cellular wide-area communication system to the non-cellular local-area communication system on the basis of the obtained access point information.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
AIS AP Information Signaling
AP Access Point
CE Control Element
CN Core Network
DECT Digital Enhanced Cordless Telecommunications
eNB evolved Node B (E-UTRA base station)
EPC Evolved Packet Core
E-UTRA Evolved UTRA
IE Information Element
IEEE Institute of Electrical and Electronics Engineers
LTE Long Term Evolution
LTE-A Long Term Evolution Advanced
MAC Medium Access Control
MIMO Multiple Input Multiple Output
NB Node B (UTRA base station)
ORS Offload Request Signaling
PLMN Public Land Mobile Network
QoS Quality-of-Service
RAIS Report AP Information Signaling
RAN Radio Access Network
RRC Radio Resource Control
UE User Equipment
UMTS Universal Mobile Telecommunications System
UTRA UMTS Terrestrial Radio Access
WLAN Wireless Local Area Network

What is claimed is:

1. A method comprising:
   establishing an X3 connection with an access point of a non-cellular local-area communication system;
   obtaining, via the X3 connection at a radio access network level of a cellular wide-area communication system, access point information about at the access point in at least one of an interface setup operation or an interface reset operation for the X3 interface triggered by an event at the access point, the triggering event includes at least a change of a working channel of the access point, a change in a working bandwidth of the access point, and a change in a working system version of the access point; and
   performing, at the radio access network level of the cellular wide-area communication system, traffic offloading management for a terminal being served in the cellular wide-area communication system to enable offloading of terminal-related traffic from the cellular wide-area communication system to the non-cellular local-area communication system on the basis of the obtained access point information.

2. A non-transitory computer-readable medium including computer-executable computer program code which, in response to running the program on a computer, is configured to cause the computer to carry out the method according to claim 1.

3. The method according to claim 1, wherein the triggering event further includes an overload condition at the access point.

4. An apparatus comprising
   at least one processor configured to cause the apparatus to
      establish an X3 connection with an access point of a non-cellular local-area communication system;
      obtain, via the X3 connection at a radio access network level of a cellular wide-area communication system, access point information about the access point in at least one of an interface setup operation or an interface reset operation for the X3 interface triggered by an event at the access point, the triggering event includes at least a change of a working channel of the access point, a change in a working bandwidth of the access point, and a change in a working system version of the access point; and
      perform, at the radio access network level of the cellular wide-area communication system, traffic offloading management for a terminal being served in the cellular wide-area communication system to enable offloading of terminal-related traffic from the cellular wide-area communication system to the non-cellular local-area communication system on the basis of the obtained access point information.

5. The apparatus according to claim 4, wherein the at least one processor is configured to cause the apparatus to notify at least part of the obtained access point information to the terminal.

6. The apparatus according to claim 4, wherein the at least one processor is configured to cause the apparatus to obtain:
   operating information including a system version, a working channel, a communication rate, a communication bandwidth, beacon information, an address and a network identifier of the access point as the access point information in an interface reset operation for the X3 interface.

7. The apparatus according to claim 4, wherein the at least one processor is configured to cause the apparatus to perform a mobility management operation for controlling mobility of the terminal between the cellular wide-area communication system and the non-cellular local-area communication system via the X3 interface.

8. The apparatus according to claim 4, wherein the at least one processor is configured to cause the apparatus to perform an energy saving operation for controlling a power configuration of the access point and an operation management operation for controlling an operation of the access point via the X3 interface.

9. The apparatus according to claim 4, wherein the at least one processor is configured to cause the apparatus to obtain access point information about the access point from the terminal being associated with the access point.

10. The apparatus according to claim 9, wherein the at least one processor is configured to cause the apparatus to:
signal a traffic offloading request to the terminal, wherein access point information about the access point is obtained from the terminal upon first association of the terminal to the access point in response to the traffic offloading request.

11. The apparatus according to claim 10, wherein the traffic offloading request comprises assistance information for access point discovery in the non-cellular local-area communication system.

12. The apparatus according to claim 10, wherein
the traffic offloading request comprises an enabler to configure the terminal to report the access point information about the access point upon first association, or
a configuration signaling is broadcast to configure the terminal to report access point information about the access point upon first association.

13. The apparatus according to claim 12, wherein
the apparatus is operable as or at a base station of the cellular wide- area communication system,
the cellular wide-area communication system comprises a long term evolution and/or long term evolution advanced and/or universal mobile telecommunication system, and
the non-cellular local-area communication system comprises a wireless local area network system.

14. The apparatus according to claim 9, wherein the at least one processor is configured to cause the apparatus to:
select the terminal from a plurality of terminals to continue access point information reporting and signal an access point information reporting request to the terminal, wherein access point information about the access point is obtained from the terminal during continuing association of the terminal to the access point in response to the access point information reporting request.

15. The apparatus according to claim 14, wherein the selecting is based on at least one of power headroom, battery status, and position of the terminal.

16. The apparatus according to claim 14, wherein the access point information reporting request requests a periodic reporting with a configured reporting interval or an event-triggered reporting upon at least one configured event in terms of a change or status of operating information and/or load information of the access point.

17. The apparatus according to claim 9, wherein the at least one processor is configured to cause the apparatus to obtain from the terminal:
operating information including a system version, a working channel, a communication rate, a communication bandwidth, beacon information, an address and a network identifier of the access point as the access point information, and/or
load information including at least one of a load status, a collision rate, an interference status and quality-of-service mapping as the access point information.

18. The apparatus according to claim 4, wherein the at least one processor is configured to cause the apparatus to command the terminal to join, leave or stay with the access point.

19. The apparatus according to claim 4, wherein the at least one processor is configured to cause the apparatus to obtain load information including at least one of a load status, a collision rate, an interference status and quality-of-service mapping as the access point information in a load management operation via the X3 interface.

20. An apparatus comprising:
means for establishing an X3 connection with an access point of a non-cellular local-area communication system;
means for obtaining, via the X3 connection at a radio access network level of a cellular wide-area communication system, access point information about the access point in at least one of an interface setup operation of an interface reset operation for the X3 interface in response to a triggering event at the access point, the triggering event includes at least a change of a working channel of the access point, a change in a working bandwidth of the access point, and a change in a working system version of the access point; and
means for performing, at the radio access network level of the cellular wide-area communication system, traffic offloading management for a terminal being served in the cellular wide-area communication system to enable offloading of terminal-related traffic from the cellular wide-area communication system to the non-cellular local-area communication system on the basis of the obtained access point information.

* * * * *